US006993637B1

(12) United States Patent
Kwong

(10) Patent No.: US 6,993,637 B1
(45) Date of Patent: Jan. 31, 2006

(54) UNIFIED MEMORY SYSTEM FOR MULTIPLE PROCESSORS AND METHOD FOR CONTROLLING THE SAME

(75) Inventor: Mark J. Kwong, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 300 days.

(21) Appl. No.: 10/290,585

(22) Filed: Nov. 7, 2002

(51) Int. Cl.
G06F 12/00 (2006.01)
(52) U.S. Cl. ............................ 711/167; 711/5; 711/106
(58) Field of Classification Search ........ 711/200–221, 711/150–160, 167, 5, 106, 168
See application file for complete search history.

(56) References Cited

U.S. PATENT DOCUMENTS

| 5,895,481 A * | 4/1999 | Yap ................................ 711/5 |
| 6,272,600 B1 * | 8/2001 | Talbot et al. ................ 711/140 |
| 6,400,626 B1 * | 6/2002 | Williams et al. ............. 365/205 |
| 6,453,400 B1 * | 9/2002 | Maesako et al. ............. 711/167 |
| 6,456,676 B1 * | 9/2002 | O'Connor et al. ........... 375/354 |
| 2002/0174292 A1 * | 11/2002 | Morita et al. ................ 711/105 |

* cited by examiner

*Primary Examiner*—Pierre-Michel Bataille
(74) *Attorney, Agent, or Firm*—Thelen Reid & Priest, LLP

(57) ABSTRACT

A memory system for multiple processors includes a unified memory including a plurality of memory banks, and a memory controller coupled to the unified memory. The memory controller receives requests from the multiple processors, each of the requests including information of a memory address. The memory controller selects one of the memory banks by asserting a request signal only for a memory bank including the requested memory address, and provides the requesting processor with a requested memory operation on the selected memory bank.

43 Claims, 7 Drawing Sheets

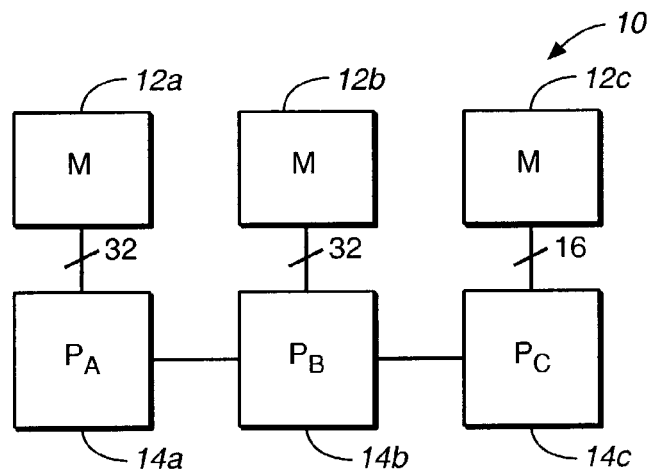
FIG._1
*(PRIOR ART)*
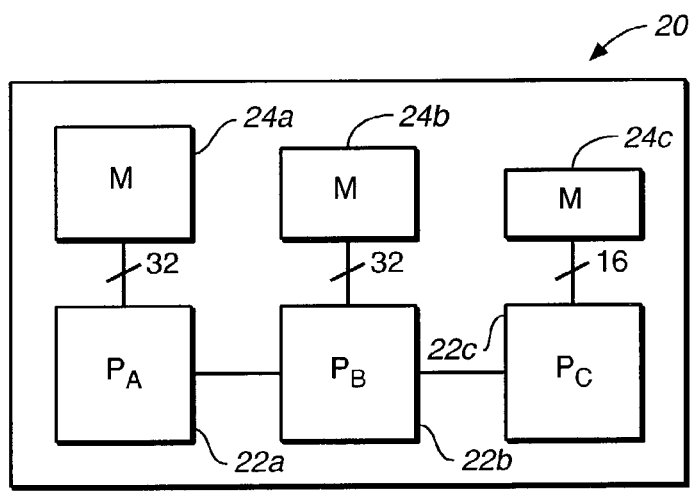
FIG._2
*(PRIOR ART)*
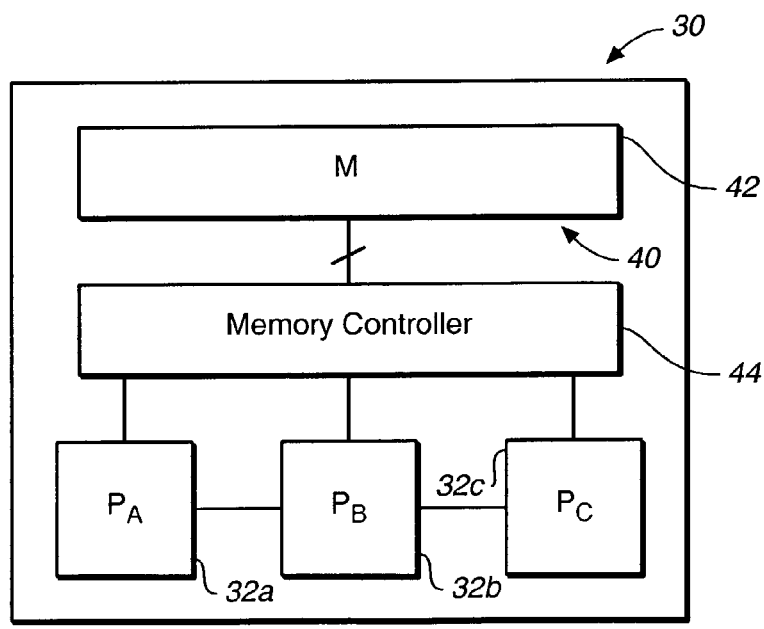
FIG._3

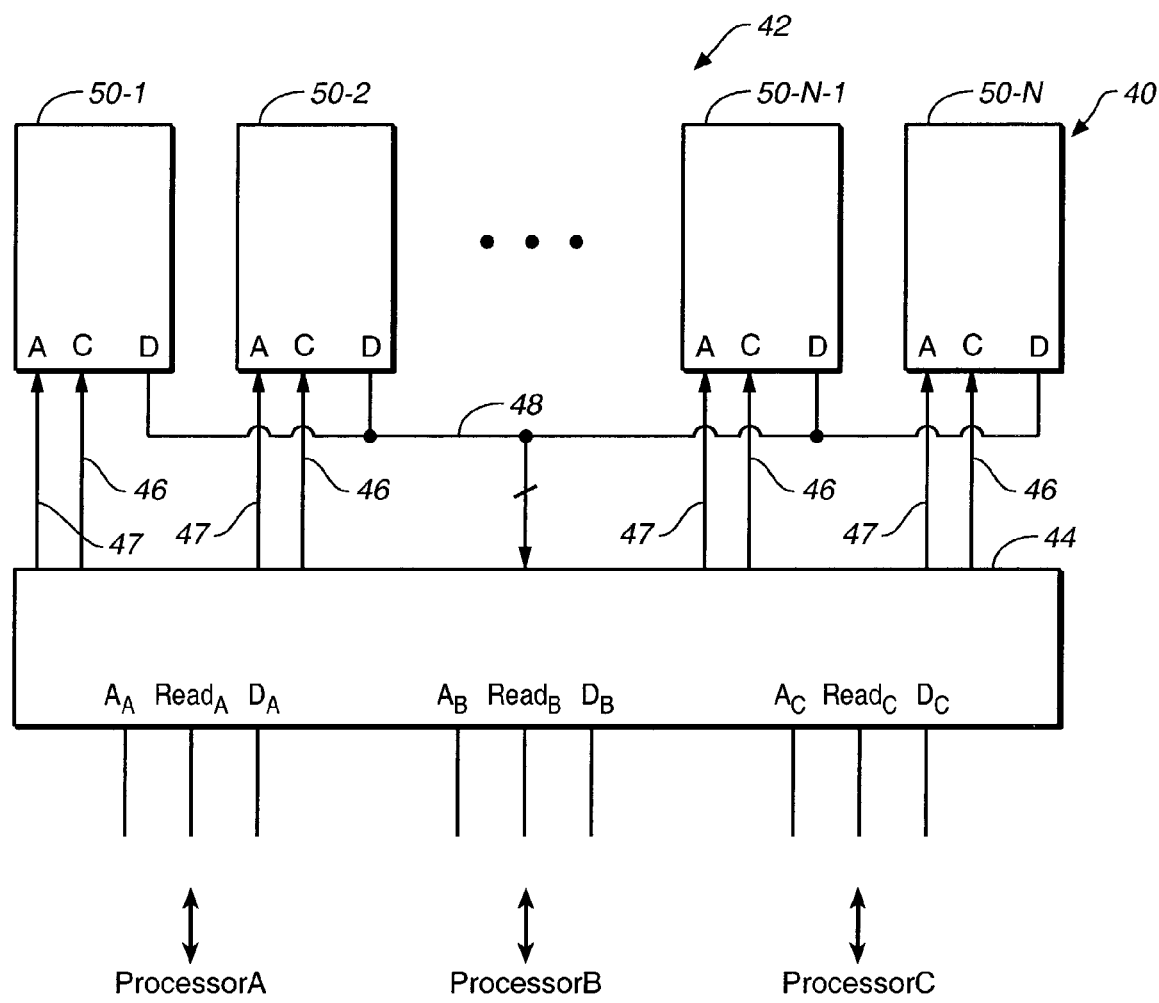
FIG._4

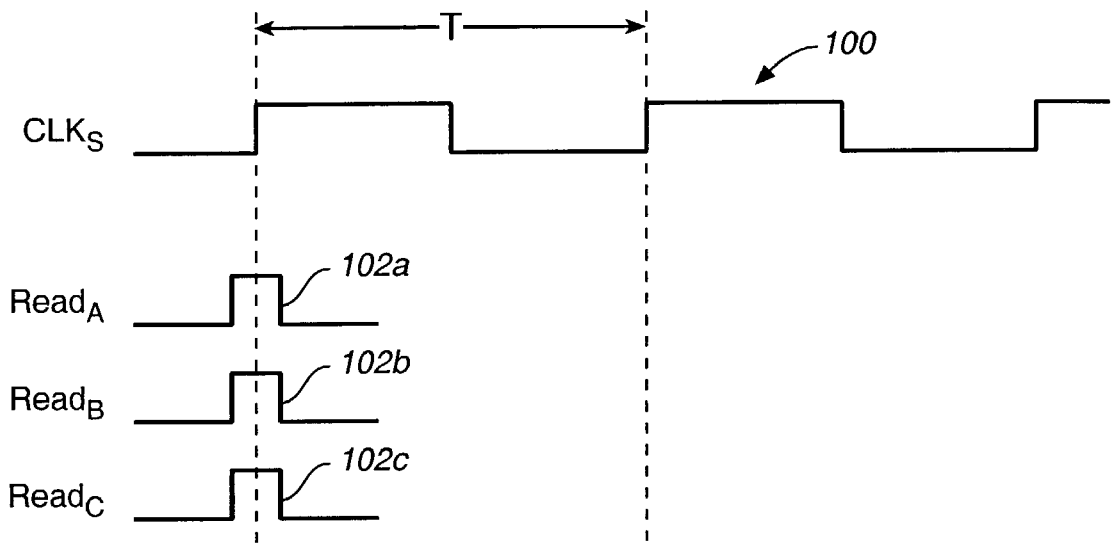
FIG._5A
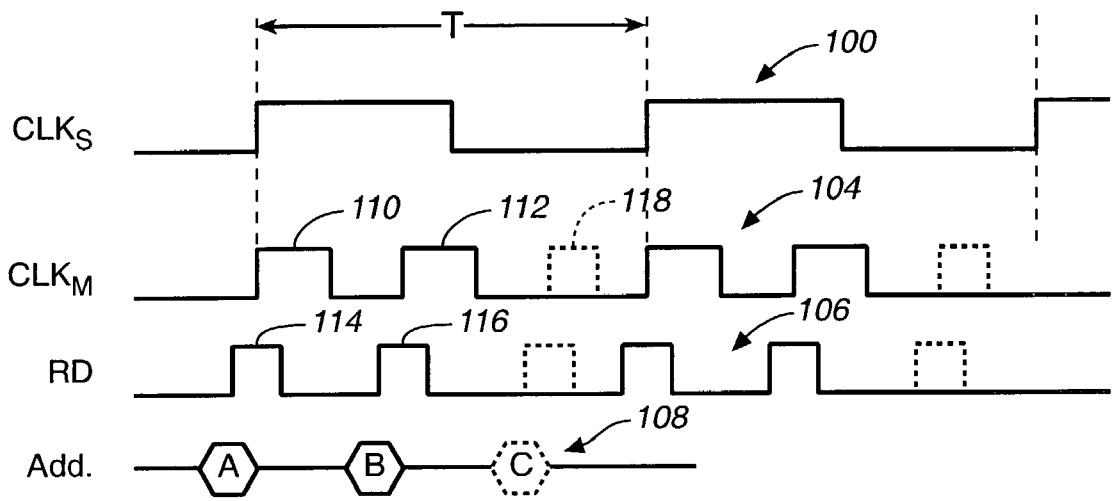
FIG._5B

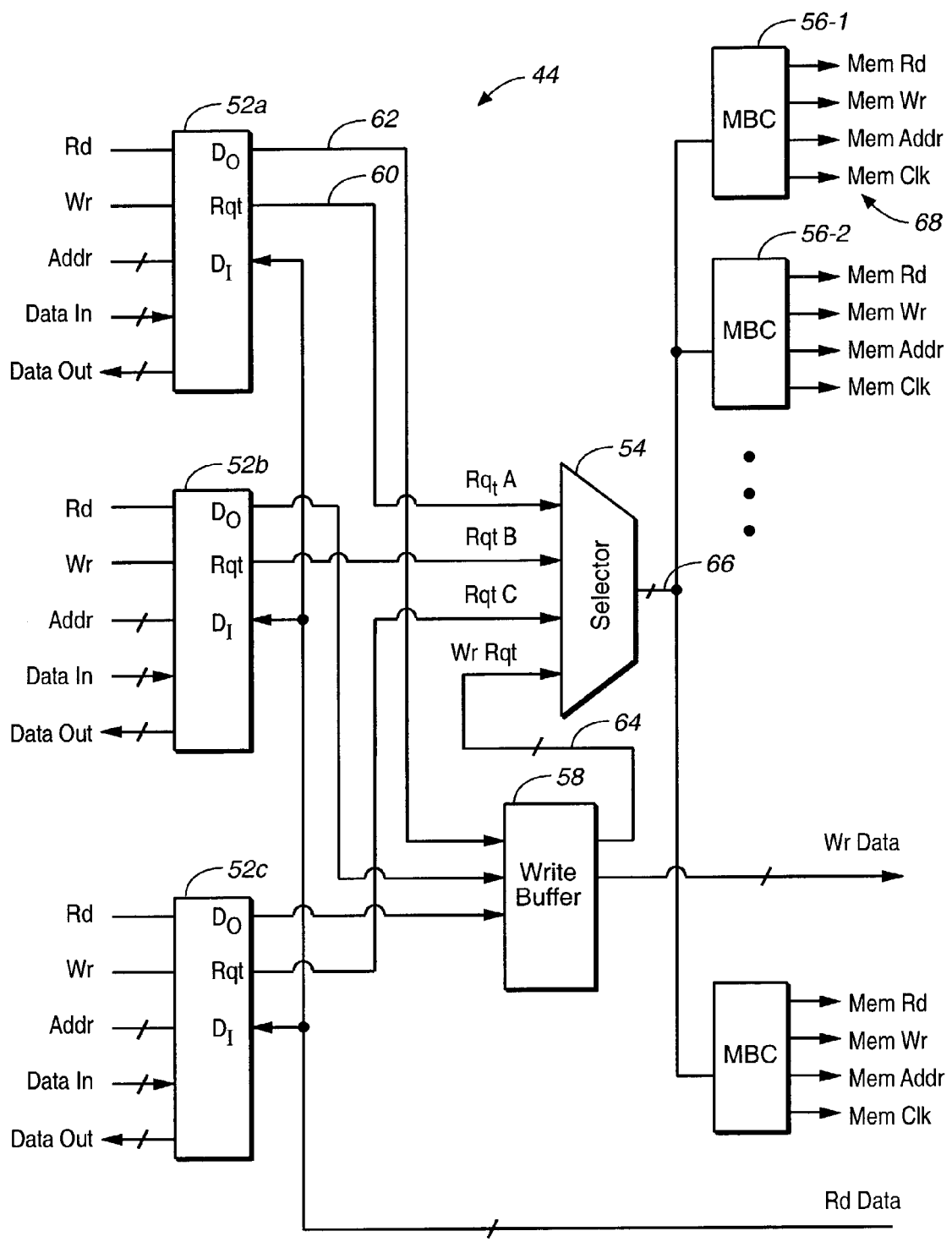
FIG._6

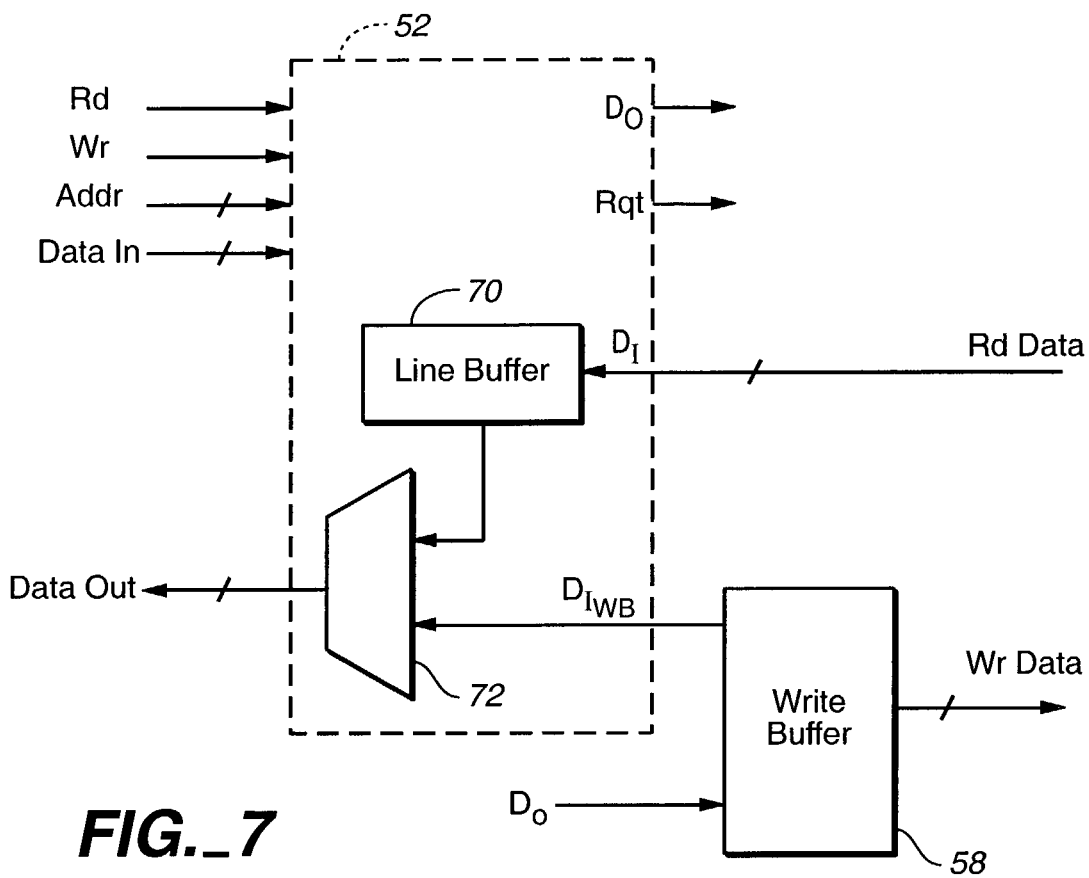
FIG._7
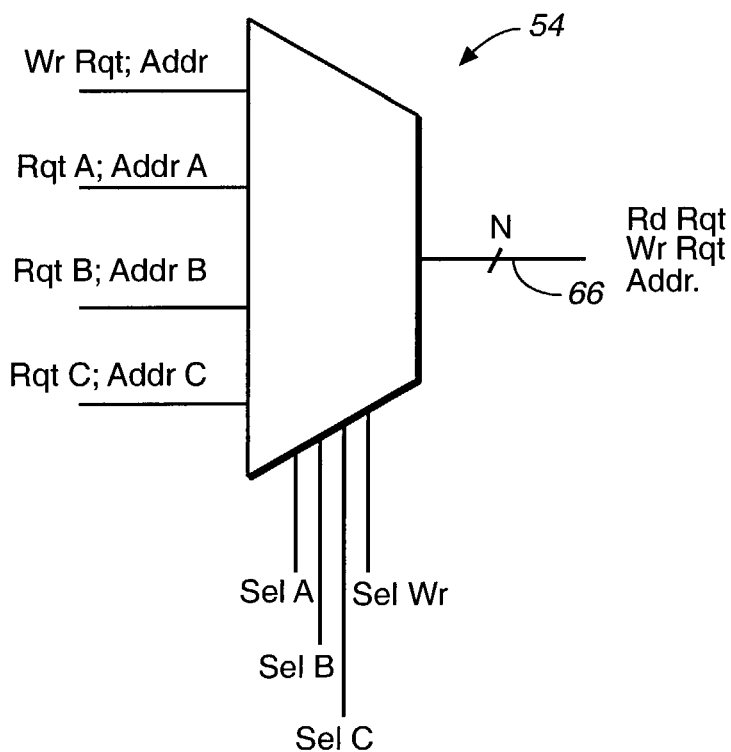
FIG._8

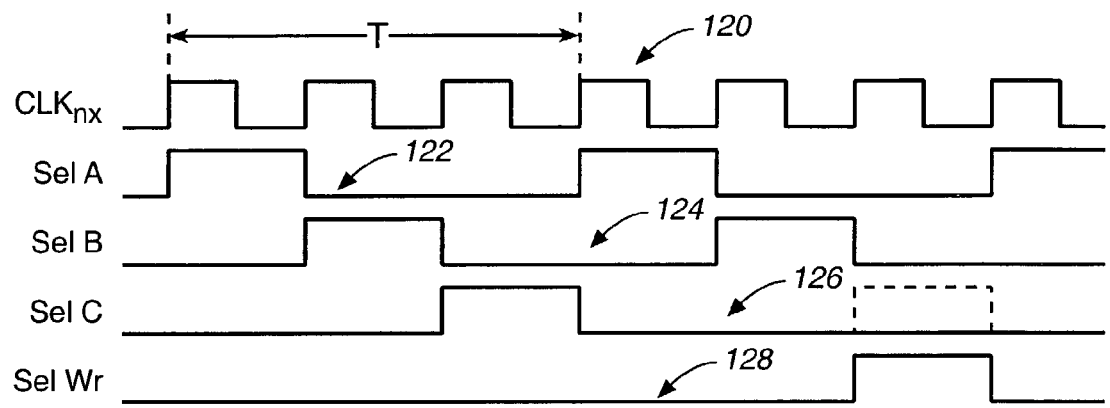
FIG._9
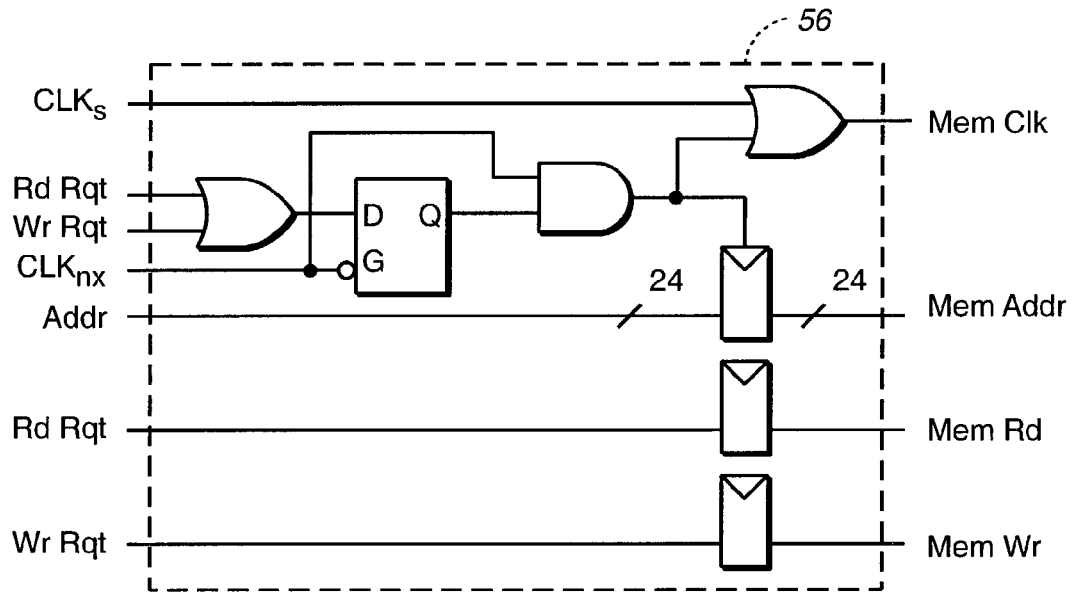
FIG._10
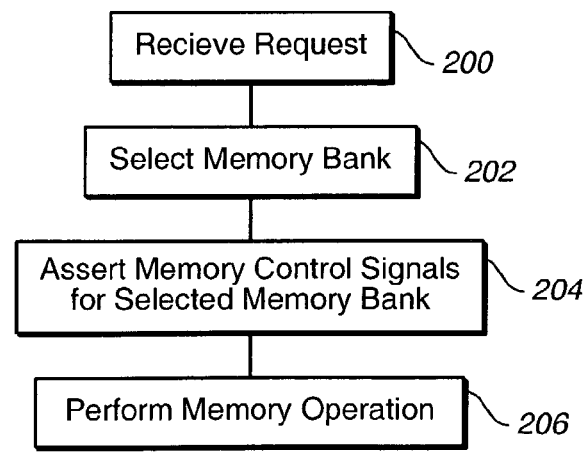
FIG._12

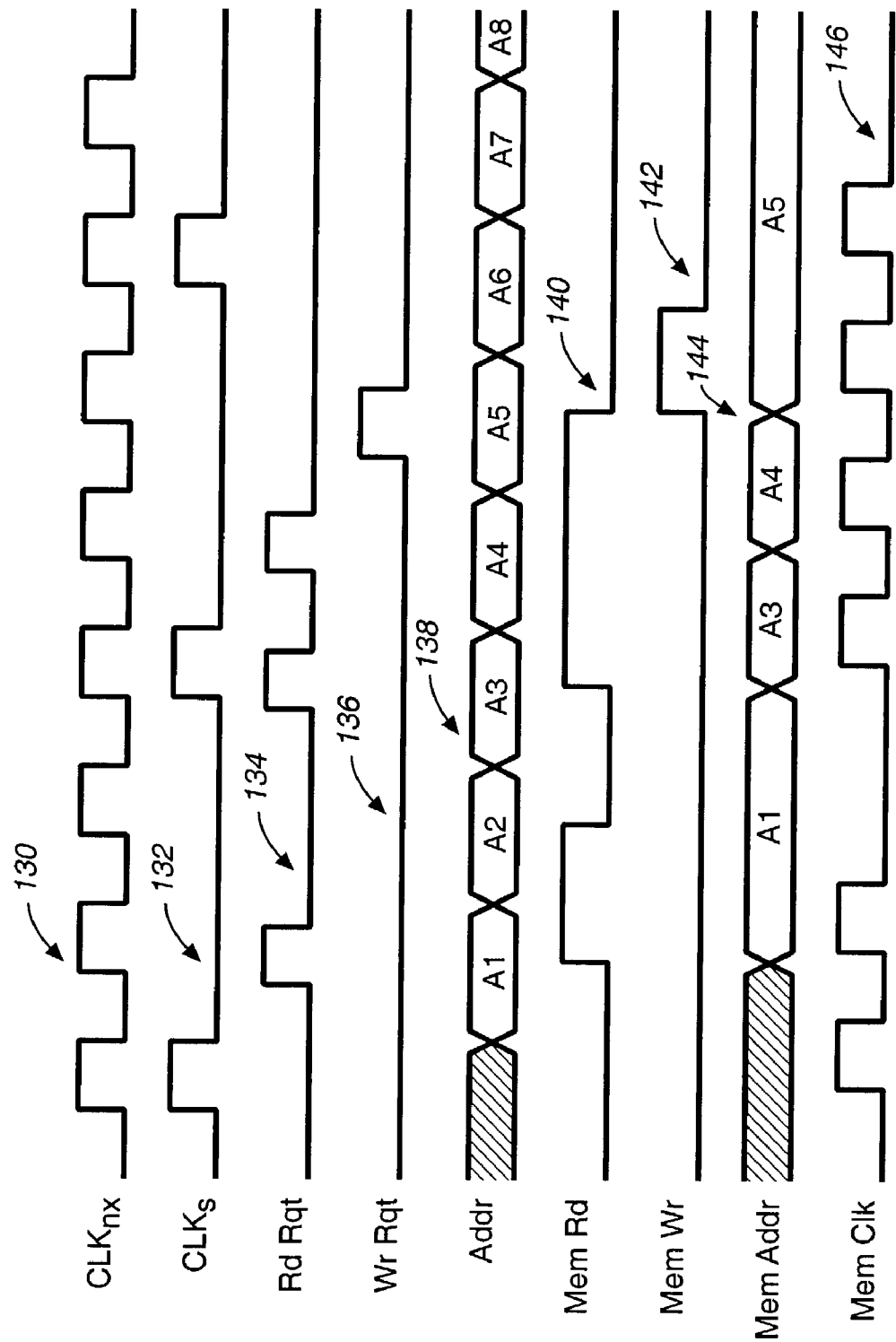
FIG._11

UNIFIED MEMORY SYSTEM FOR MULTIPLE PROCESSORS AND METHOD FOR CONTROLLING THE SAME

FIELD OF THE INVENTION

The present invention relates to a memory system. More particularly, the present invention relates to a unified memory for multiple processors and a method for controlling the same.

BACKGROUND OF THE INVENTION

FIG. 1 schematically illustrates a conventional multiple processor system 10 having a distributed memory system 12 (memories 12a, 12b, and 12c). In the system 10, a separate and dedicated memory is provided to each processor. For example, the memories 12a, 12b, and 12c may be a dynamic random access memory (DRAM) of an appropriate size, for example, 16-Mbit, 8-Mbit, and 4-Mbit DRAMs, respectively. The memories 12a, 12b, and 12c are connected to the corresponding processors 14a, 14b, and 14c via a data bus (32 bit or 16 bit, for example). Each processor accesses its designated memory only, and does not share the memory with other processors.

IC designers can integrate significant densities of memory and logic together on the same chip in order to reduce chip count and system cost (commonly referred to as "System-On-Chip"). When such a multiple processor system is integrated into one integrated circuit (IC) as an embedded system, memories are also embedded using an embedded DRAM process or other high density embedded memory technology. FIG. 2 schematically illustrates a conventional embedded system 20 integrating multiple processors 22 (22a, 22b, and 22c) onto one IC chip along with associated embedded memory blocks 24 (24a, 24b, and 24c). The embedded memory blocks 24 may include DRAM or 1T-SRAM®, available from MoSys Inc. of Sunnyvale, Calif., of selected sizes (logical and physical) for the corresponding processors. However, although the processors and memories are embedded onto one single chip, the memory architecture is substantially the same as that shown in FIG. 1, and the power consumption from the distributed memory system may be still too high for some applications for the embedded system.

BRIEF DESCRIPTION OF THE INVENTION

A memory system for multiple processors includes a unified memory including a plurality of memory banks, and a memory controller coupled to the unified memory. The memory controller receives requests from the multiple processors, each of the requests including information of a memory address. The memory controller selects one of the memory banks by asserting a request signal only for a memory bank including the requested memory address, and provides the requesting processor with a requested memory operation on the selected memory bank.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a block diagram schematically illustrating a conventional multiple processor system having a distributed memory system.

FIG. 2 is a block diagram schematically illustrating a conventional embedded system integrating multiple processors onto an IC chip along with associated embedded memory blocks.

FIG. 3 is a block diagram schematically illustrating an embedded system including a memory system for multiple processors in accordance with one embodiment of the present invention.

FIG. 4 is a diagram schematically illustrating the memory system for multiple processors in accordance with one embodiment of the present invention.

FIG. 5A is a timing diagram schematically illustrating the base clock signal ($CLK_S$) and read requests ($Read_A$, $Read_B$, and $Read_C$) from the multiple processors.

FIG. 5B is a timing diagram schematically illustrating a memory clock signal ($CLK_M$), a read request signal (RD), and an address signal (Add) for a memory bank in accordance with one embodiment of the present invention.

FIG. 6 is a block diagram schematically illustrating an example of the memory controller in accordance with one embodiment of the present invention.

FIG. 7 is a block diagram schematically illustrating an example of the interface module in accordance with one embodiment of the present invention.

FIG. 8 is a block diagram schematically illustrating the memory request/memory bank selector in accordance with one embodiment of the present invention.

FIG. 9 is a timing diagram schematically illustrating the controller clock signal (CLK-nx), and selection signals allocating the clock cycle (time slice) to processors in accordance with one embodiment of the present invention.

FIG. 10 is a block diagram schematically illustrating an example of the memory bank control module in accordance with one embodiment of the present invention.

FIG. 11 is a timing diagram schematically illustrating the input and output signals of the memory bank control module in accordance with one embodiment of the present invention.

FIG. 12 is a process flow diagram schematically illustrating a method for controlling a unified memory for multiple processors in accordance with one embodiment of the present invention.

DETAILED DESCRIPTION

Embodiments of the present invention are described herein in the context of a unified memory system for multiple processors and a method for controlling the same. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 3 schematically illustrates an embedded system 30 including a memory system 40 for multiple processors 32 in accordance with one embodiment of the present invention. The memory system 40 and the multiple processors 32 are typically formed on a same semiconductor substrate of an IC chip (System-On-Chip). The memory system 40 includes a unified memory 42, and a memory controller 44 coupled to the unified memory 42. The memory controller 44 receives requests from the multiple processors 32, for example, processors 32a, 32b, and 32c. Although the following explanation may use a multi-processor system having three processors for illustrative purposes (processor A, processor B, and processor C), the number of the processors is not limited to three, but the system may include any number of processors.

FIG. 4 schematically illustrates the memory system 40 in accordance with one embodiment of the present invention. As shown in FIG. 4, the unified memory 42 includes a plurality of memory banks 50 (50-1, 50-2, ... 50-N). Each of the memory bank 50 may include DRAM, or one-transistor memory cell arrays. For example, the memory bank 50 has one-transistor memory cell arrays such as 1T-SRAM®, available from MoSys Inc. of Sunnyvale, Calif., which provides high memory density similar to the embedded DRAM with an SRAM-like interface. Each of the memory banks 50 has a memory size smaller than typical embedded memory blocks, for example, 2-Mbit to 4-Mbit DRAM of 1T-SRAM®. The total size of the unified memory 42 may be the same as a conventional distributed memory system for the multiple processors. In the unified memory architecture, however, the multiple processors 32 share the same unified memory 42. As shown in FIG. 4, typically, a control signal bus 46 and an address signal bus 47 are individually provided for each of the memory banks 50, while a data bus 48 is shared by the memory banks 50.

The memory controller 44 receives requests from the multiple processors 32, such as a read request, a write request, and the like. Each of the requests includes information of a memory address. For example, a read request from a processor is accompanied by an address signal specifying the memory address of the unified memory 42 from which the data is to be read (requested address). The memory controller 44 selects one of the memory banks 50 based on the request, by asserting a request signal (via the control signal bus 46 and the address signal bus 47) only for the memory bank including the requested memory address, so that the requesting processor can have access to that memory bank. The memory controller 44 provides the requesting processor with a requested memory operation on the selected memory bank.

For example, if the requested address is within a memory space of the memory bank 50-2, only the request signal for that memory bank 50-2 is activated, while the request signals for other memory banks remain inactive and are left unchanged (unswitched). That is, only one memory bank is accessed per request. Since the size of each memory bank is smaller size than that of a typical memory block dedicated to one processor, it reduces the power consumption due to memory access operation. For example, in the conventional multi-processor system 20 having memory blocks of 16 Mbit, 8 Mbit, and 4 Mbit, the power consumption by accessing the memory blocks (with one memory operation request per processor) is the sum: $P_{16M}+P_{8M}+P_{4M}$ (where $P_{xM}$ denotes the power for accessing x-Mbit memory space). In accordance with this embodiment of the present invention, the power consumption for the same memory access by the processors is: $P_{4M}+P_{4M}+P_{4M}$, where the memory bank size is 4 Mbit.

In addition, by using the unified memory architecture, each processor can access memory blocks that otherwise would have been dedicated to other processors. This eliminate the need for providing Direct Memory Access (DMA) between memory blocks in order to transfer data when one of the multiple processors need the data used by another.

In accordance with one embodiment of the present invention, the memory controller 44 allows multiple access to a memory bank 50 during one cycle of a base clock signal for the multi-processors 32. FIG. 5A schematically illustrates the base clock signal 100 ($CLK_S$) and read requests 102a, 102b, and 102c ($Read_A$, $Read_B$, and $Read_C$) from the multiple processors. As shown in FIG. 5A, each read request is received by the memory controller 44 synchronized with the base clock timing. The memory controller 44 may include a clock signal generator (not shown) that generates a memory clock signal having more than one active edges during one clock cycle (T) of the base clock signal. The memory clock signal is used for controlling the memory bank operations.

FIG. 5B schematically illustrates the memory clock signal 104 ($CLK_M$), a read request signal 106 (RD), and an address signal 108 (Add) for a memory bank. The diagram depicts the case where the read requests 102a and 102b in FIG. 5A both access the same memory block. The memory clock signal 104 has at least two active edges to handle the situation. For example, the first time slice (first cycle) 110 of the memory clock signal 104 is allocated to process the request from the first processor (processor A) and the second time slice (second cycle) 112 is allocated to a second processor (processor B). Since the both requests require access to the same memory bank, the read request signal 106 is activated (signal pulses 114 and 116) for the corresponding active edges of the memory clock signal 104. At the same time, the address signal 108 is also activated for the read request signal (i.e., provides the requested address).

In the case where the request 102c from a third processor (processor C) is also addressed the same memory bank, another active edge 118 may also be provided to the memory clock signal 104. This additional active edge provides the third processor to access the memory bank during the same cycle of the base clock signal 100. For example, if the memory banks can perform up to 150 MHz (maximum memory clock speed), the individual processors can run at 50 MHz and share the same memory bank in one base clock cycle. Typically, in order to allow each of the multiple processors to access a memory bank at a given base clock cycle, a controller clock signal having a frequency of n×f, where n is the number of the multiple processors and f is a frequency of the base clock signal, may be used to generate the memory clock signal. That is, if the system has n microprocessors operating with a base clock signal of k MHz, the controller clock signal of nk Hz may be used. It should be noted that the memory clock signal with which the memory banks operates does not have to have all active edges corresponding to the controller clock signal transitions.

FIG. 6 schematically illustrates an example of the memory controller 44 in accordance with one embodiment of the present invention. As shown in FIG. 6, the memory controller 44 includes interface modules 52 (52a, 52b, and 52c) each provided for one of the multiple processors, a memory request/memory bank selector 54 coupled to the interface modules 52, and a memory bank control module 56 provided for each of the memory banks and couple to the memory request/memory bank selector 54. Each interface module 52 receives requests from a corresponding processor, and also handles data input to and output from the processor. The request includes information of a memory address to be accessed, and may be a read request or write request, as described above. As shown in FIG. 6, each of the interface modules 52 may have a read request port (Rd), a write request port (Wr), an address port (Addr), a data input port (Data In), and a data output port (Data Out). When the interface module 52 receives a read request, it forwards the request (Rqt) 60 to the memory request/memory bank selector 54 along with the requested address. It should be noted that address and clock signal lines up to the memory bank control modules 56 are not shown in FIG. 6 for simplicity.

The memory request/memory bank selector 54 selects one of the memory banks based on the received request by asserting a request signal 66 only for the memory bank including the requested memory address. In response to the request signal 66, the memory bank control modules 56 assert memory control signals 68 for the selected memory bank. Only one of the memory bank control modules 56 operates per request signal. The memory control signals 68 may include a memory clock signal (Mem Clk), a memory address signal (Mem Addr), a memory read enable signal (Mem Rd), and/or a memory write enable signal (Mem Wr).

In accordance with one embodiment of the present invention, the memory controller 44 further includes a write buffer 58 coupled to each of the interface modules 52 and to the memory request/memory bank selector 54. When the interface module 52 receives a write request (Wr) with the requested address (Addr) and the data (Data In) to be written to a memory bank, it forwards the write request, the address, the data 62 (only the data $D_O$ is shown in FIG. 6 for simplicity) to the write buffer 58. The write buffer 58 maintains the data, and generates a second write request 64 based on a buffer state, for example, when the buffer space is full. The write buffer 58 sends the write request 64 to the memory request/memory bank selector 54, and the data (Wr Data) to the memory bank via the data bus. The write buffer 58 may be an "intelligent" buffer, and generates the write request 64 (and sends the data) when the buffer space is full or becomes full in response to the write request from the interface module 52. The write buffer 58 may also generate the write request 64 in a periodic manner.

FIG. 7 schematically illustrates an example of the interface module 52 in accordance with one embodiment of the present invention. As shown in FIG. 7, the interface module 52 may include a read buffer 70, for example, a line buffer. The read buffer 70 temporally maintains the data that has been read from the selected memory bank and is to be returned to the requesting processor. In accordance with this embodiment, the read buffer 70 is provided locally for each of the processors (in the corresponding interface module 52), while the write buffer 58 is provided as a global buffer for the multiple processors. However, the write buffer may be provided locally for each processor. The interface module 52 may also include an output selector 72 that selectively outputs data from the line buffer 70 and data from the write buffer 58 to the processor (as described below).

In this embodiment, when the interface module 52 receives a read request from the corresponding processor, it checks the requested address and locates the requested data based on the address. For example, the requested address is compared with the write address of the data (the memory address to which the data is written) in the write buffer 58, and then with the read address of the data in the line buffer 70. If the requested data is maintained in the write buffer 58, the data is read from the write buffer 58 rather than the memory bank. If the requested data is not found in the write buffer 58 but is maintained in the read buffer 70, the data is read from the read buffer 70. If the data is not maintained in either buffer, the interface module 52 generates a read request (Rqt) and sends it to the memory request/memory bank selector 54 (FIG. 6). When the data is read from the memory bank, the data (Rd Data) is put into the lead buffer 70 and output to the requesting processor (Data Out) through the output selector 72. When the interface module 52 receives a write request, it sends the data ($D_O$) to the write buffer 58, as described above.

FIG. 8 schematically illustrates the memory request/memory bank selector 54 in accordance with one embodiment of the present invention. The memory request/memory bank selector 54 is operated by the controller clock signal (CLK-nx) having the clock cycle n times faster than that of the base clock signal $CLK_S$ (for n-processor system). This example shows where n=3. The memory request/memory bank selector 54 receives the read request and the requested address (Rqt A; Addr A, Rqt B; Addr B, and Rqt C; Addr C) from each of the interface modules 52, and allocates a selected cycle (time slice) of the controller clock signal to each of the multiple processors within one cycle of the base clock signal. As shown in FIG. 8, the request signal 66 is actually a set of multiple signals for the plurality of memory banks. Only one of the request signals is asserted (logic high) for the currently-accessed memory bank at a given time slice, and the remaining request signals for non-accessed memory banks are set inactive (logic low).

FIG. 9 schematically illustrates the controller clock signal 120 (CLK-nx) and selection signals 122, 124 and 126 allocating the clock cycle (time slice) to the processors. For example, when the selection signal 122 (Sel A) is active, the memory request/memory bank selector 54 selects a memory bank (or a memory control module 56) in accordance with a read request signal from the interface module 52a (originally from the processor A). Similarly, when the selection signal 124 (Sel B) is active, the memory request/memory bank selector 54 selects a memory bank in accordance with a read request signal from the interface module 52b (originally from the processor B), and so on. For example, the memory request/memory bank selector 53 asserts a read request signal (Rd Rqt) for a memory bank by setting an appropriate read request signal for that memory bank to logic high (1), and setting the read request signal for all other memory banks to logic low (0). Also, the write request signal for all memory banks is set to logic low (0) when receiving a read request.

As shown in FIGS. 8 and 9, the memory request/memory bank selector 54 also receives a write request with address information (Wr Rqt: Addr) from the write buffer 58, and allocates the write request to an appropriate time slice as well. The memory request/memory bank selector 54 selects a memory bank when the selection signal 128 (Sel Wr) is active. For example, the memory request/memory bank selector 54 selects the memory bank by setting an appropriate write signal (Wr Rqt) for that memory bank to logic high (1), and setting all other write request and all read request signals to logic low (0). The memory request/ memory bank selector 54 also solves conflict, if any, between a read request from the interface module 52 and the write request from the write buffer 58. For example, the memory request/memory bank selector 54 may allocate the write request in the time slice where no read request is received, and/or give the priority to the write request over a conflicting read request.

FIG. 10 schematically illustrates an example of the memory bank control module 56 in accordance with one embodiment of the present invention. As shown in FIG. 10, the memory bank control module 56 generates control signals for the corresponding memory bank, including a memory clock signal (Mem Clk), a memory address signal (Mem Addr), a memory read enable signal (Mem Rd), and a memory write enable signal (Mem Wr). These memory control signals may be generated based on the read request signal (Rd Rqt), the write request signal (Wt Rqt), and the address signal (Addr) from the memory request/memory bank selector 54, the base clock signal ($CLK_S$), and the controller clock signal (CLK nx).

FIG. 11 schematically illustrates the signals in the memory bank control module 56. The memory bank control module 56 operates with the controller clock signal 130 (CLK nx, where n is three in this example). The read request signal 134 (Rd Rqt) and the write request signal 136 (Wr Rqt) are asserted by the memory request/memory bank selector 54 for a memory bank when such requests from the multiple processors are addressed to that memory bank, as discussed above. The address signal 138 (Addr) may toggle in accordance with the controller clock signal. However, the memory address signal 144 (Mem Addr) is changed only when either the read request signal 134 or the write request signal 136 is asserted (at the logic high).

In response to the read request signal 134 asserted (i.e., each logic high state), a single pulse in the read enable signal 140 is generated. Similarly, in response to the write request signal 136 asserted, a single pulse in the write enable signal 142 is generated. Also, the memory clock signal 146 is generated in response to either one of the read request signal 134 and the write request signal 136 is asserted. That is, the memory clock signal has its active edges corresponding to the request signals assertion. In addition, the memory clock signal 146 may be generated corresponding to pulses of the base clock signal 132, which may be used for maintenance of the memory bank, for example, for the refresh operation of the memory bank. According to the embodiment of the invention, as described above, toggling or switching of the control signals (including the address signal) for a memory bank is substantially minimized, thereby reducing the power consumption for activating such signals.

FIG. 12 schematically illustrates a method for controlling a unified memory for multiple processors in accordance with one embodiment of the present invention. The unified memory includes a plurality of memory banks, as described above. First, a request from one of the multiple processors is received (200). The request includes information of a memory address, and may be a read request of a write request. One of the memory banks is selected based on the request (202) by asserting a request signal only for the memory bank including the requested memory address. Memory control signals are asserted for the selected memory bank in response to the request signal (204), and a requested memory operation on the selected memory bank is provided to the requesting processor (206).

The memory bank selection (202) may be conducted using a controller clock signal having a frequency of n×f, where n is the number of the multiple processors and f is a frequency of a base clock signal for the multiple processors. Also, the memory bank selection (202) may include allocating a selected cycle of the controller clock signal to each of the multiple processors within one cycle of the base clock signal.

The assertion of the memory control signals (204) may include generating a memory clock signal using the controller clock signal. The memory clock signal has active edges corresponding to the request signals addressed to the memory bank. The memory clock signal may also have active edges corresponding to active edges of the base clock signal. In addition, the assertion of the memory control signals (204) may further include switching a memory address signal in response to the request signal addressed to the memory bank, asserting memory read enable signal having a pulse corresponding to a read request addressed to the memory bank, and asserting memory write enable signal having a pulse corresponding to a write request addressed to the memory bank.

As described above, the unified memory architecture allows each processor to access the memory and at the same time minimizes the power consumed from accessing the memory. The memory includes multiple small banks (for example, 2 to 4-Mbit) such as one-transistor memory cell arrays. The memory controller is designed to service the requests from each of the processors and to generate the memory access signals only for the particular bank of the unified memory that needs to be accessed. The control signals to access the other banks of the unified memory are not asserted, thereby minimizing the power consumption. Instead of accessing the entire memory block (for example, 16-Mbit block) of an embedded memory, only a small memory bank (for example, 2-Mbit bank) of the embedded memory is accessed at one time on an "as needed" basis.

As described above, in accordance with one embodiment of the present invention, since each processor has its dedicated time slice in a clock cycle and thus there is no access delay or stall due to the memory use by other processors, each processor sees the unified memory as if it has its own memory in a distributed memory system. This effectively provides the multiple processors with as good memory performance as that of a distributed memory system. Furthermore, although the memory clock signals have a clock cycle faster than that of the base clock signal, by carefully controlling the memory clock signals so as to reduce the active edges thereof, the power penalty of the faster clock signals can be avoided. Typically, such an active edge is generated only when the request signal is asserted, and optionally in response to an active edge of the base clock signal, so as to minimize the power consumption. In addition, the memory address signals also toggle or switch in response to the request signal (and otherwise remain unchanged), reducing power consumption due to signal switching. Accordingly, the same amount of memory access is provided to the multiple processor system with even less power consumption.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A memory system for multiple processors, said system comprising:
   a unified memory including a plurality of memory banks;
   a memory controller coupled to said unified memory, said memory controller receiving requests from the multiple processors, each of the requests including information of a memory address, said memory controller selecting one of the memory banks by asserting a request signal only for a memory bank including the requested memory address, and providing the requesting processor with a requested memory operation on the selected memory bank, wherein said memory system and the multiple processors are formed on a same semiconductor substrate, and
   a clock signal generator, said clock signal generator generating a memory clock signal having more than one active edges during one clock cycle of a base clock signal for the multiple processors, wherein the memory clock signal is generated using a controller clock signal having a frequency of n×f, where n is the number of the multiple processors and f is a frequency of a base clock signal for the multiple processors.

2. The memory system in accordance with claim 1 wherein the requests from the multiple processors includes:
   a read request; and
   a write request.

3. A memory system for multiple processors, said system comprising:
   a unified memory including a plurality of memory banks; and
   a memory controller coupled to said unified memory, said memory controller including:
      an interface module provided for each of the multiple processors, each interface module receiving requests from a corresponding processor, each of the requests including information of a memory address;
      a memory request/memory bank selector coupled to said interface modules, said memory request/memory bank selector selecting one of the memory banks based on the request by asserting a request signal only for the memory bank including the requested memory address, wherein said memory request/memory bank selector uses a controller clock signal having a frequency of n×f, where n is the number of the multiple processors and f is a frequency of a base clock signal for the multiple processors; and
      a memory bank control module provided for each of the memory banks and coupled to said memory request/memory bank selector, said memory bank control module asserting memory control signals for the selected memory bank in response to the request signal, wherein said memory system and the multiple processors are formed on a same semiconductor substrate.

4. The memory system in accordance with claim 3 wherein said request signal includes:
   a read request signal; and
   a write request signal.

5. The memory system in accordance with claim 3 wherein the memory control signals include at least one of:
   a memory clock signal;
   a memory address signal;
   a memory read enable signal; and
   a memory write enable signal.

6. The memory system in accordance with claim 3 wherein said memory controller further includes:
   a write buffer coupled to each of said interface modules and to said memory request/memory bank selector, said write buffer receiving write requests and maintaining data to be written to the memory banks.

7. The memory system in accordance with claim wherein said write buffer generates a second write request based on a buffer state and sends the second write request to said memory request/memory bank selector.

8. The memory system in accordance with claim 3 wherein said memory request/memory bank selector allocates a selected cycle of the controller clock signal to each of the multiple processors within one cycle of the base clock signal.

9. The memory system in accordance with claim 8 wherein said memory request/memory bank selector solves conflict between a read request from said interface module and a write request from a write buffer.

10. The memory system in accordance with claim 3 wherein said memory bank control module generates a memory clock signal using the controller clock signal, the memory clock signal having active edges corresponding to the request signals addressed to the corresponding memory bank.

11. The memory system in accordance with claim 10 wherein the memory clock signal otherwise remains inactive.

12. The memory system in accordance with claim 10 wherein the memory clock signal further includes active edges corresponding to active edges of the base clock signal.

13. The memory system in accordance with claim 12 wherein the memory clock signal otherwise remains inactive.

14. The memory system in accordance with claim 3 wherein said memory bank control module switches a memory address signal in response to the request signal addressed to the corresponding memory bank.

15. The memory system in accordance with claim 14 wherein the memory address signal does not switch without the request signal.

16. The memory system in accordance with claim 3 wherein said interface module includes:
   a read buffer for maintaining data read from the selected memory bank and to be returned to the requesting processor.

17. The memory system in accordance with claim 3 wherein each of the memory banks includes 1-transistor memory cell arrays.

18. A method for controlling a unified memory for multiple processors, the unified memory including a plurality of memory banks, the unified memory and the multiple processors being formed on a same semiconductor substrate, said method comprising:
   receiving a requests from one of the multiple processors, the request including information of a memory address;
   selecting one of the memory banks based on the request by asserting a request signal only for a memory bank including the requested memory address, wherein said selecting is conducted using a controller clock signal, the controller clock signal having a frequency of n×f, where n is the number of the multiple processors and f is a frequency of a base clock signal for the multiple processors;
   asserting memory control signals for the selected memory bank in response to the request signal; and providing the requesting processor with a requested memory operation on the selected memory bank.

19. The method in accordance with claim 18 wherein said selecting includes:

allocating a selected cycle of the controller clock signal to each of the multiple processors within one cycle of the base clock signal.

20. The method in accordance with claim 18 wherein said asserting memory control signals includes:

generating a memory clock signal using the controller clock signal, the memory clock signal having active edges corresponding to the request signals addressed to the memory bank.

21. The method in accordance with claim 20 wherein the memory clock signal otherwise remains inactive.

22. The method in accordance with claim 20 wherein the memory clock signal further includes active edges corresponding to active edges of the base clock signal.

23. The method in accordance with claim 22 wherein the memory clock signal otherwise remains inactive.

24. The method in accordance with claim 20 wherein said asserting memory control signals further includes:

switching a memory address signal in response to the request signal addressed to the memory bank.

25. The method in accordance with claim 24 wherein the memory address signal does not switch without the request signal.

26. The method in accordance with claim 20 wherein said asserting memory control signals further includes:

asserting memory read enable signal having a pulse corresponding to a read request addressed to the memory bank; and asserting memory write enable signal having a pulse corresponding to a write request addressed to the memory bank.

27. The method according to claim 18, further comprising:

temporally maintaining write data received from the multiple processors in a write buffer in response to a write request; and generating a second write request based on a buffer state.

28. The method according to claim 27, further comprising:

temporally maintaining read data in a read buffer associated with the requesting processor, the read data being read from a memory bank for the requesting processor.

29. The method according to claim 28, further comprising:

in response to a read request from one of the multiple processor, reading the requested data from the write buffer if the requested data is maintained in the write buffer;

in response to the read request, reading the requested data from the read buffer for the requesting processor if the requested data is maintained in the read buffer; and asserting a read request signal for a memory bank if the requested data is not maintained in the buffers.

30. The method in accordance with claim 27, further comprising solving conflict between a read request from one of the multiple processors and a write request from the write buffer.

31. An apparatus for controlling a unified memory for multiple processors, the unified memory including a plurality of memory banks, the unified memory and the multiple processors being formed on a same semiconductor substrate, said apparatus comprising:

means for receiving a requests from one of the multiple processors, the request including information of a memory address;

means for selecting one of the memory banks based on the request by asserting a request signal only for a memory bank including the requested memory address, wherein said means for selecting is operated using a controller clock signal, the controller clock signal having a frequency of n×f where n is the number of the multiple processors and f is a frequency of a base clock signal for the multiple processors;

means for asserting memory control signals for the selected memory bank in response to the request signal; and means for providing the requesting processor with a requested memory operation on the selected memory bank.

32. The apparatus in accordance with claim 31 wherein said means for selecting includes:

means for allocating a selected cycle of the controller clock signal to each of the multiple processors within one cycle of the base clock signal.

33. The apparatus in accordance with claim 31 wherein said means for asserting memory control signals includes:

means for generating a memory clock signal using the controller clock signal, the memory clock signal having active edges corresponding to the request signals addressed to the memory bank.

34. The apparatus in accordance with claim 33 wherein the memory clock signal otherwise remains inactive.

35. The apparatus in accordance with claim 33 wherein the memory clock signal further includes active edges corresponding to active edges of the base clock signal.

36. The apparatus in accordance with claim 35 wherein the memory clock signal otherwise remains inactive.

37. The apparatus in accordance with claim 33 wherein said means for asserting memory control signals further includes:

means for switching a memory address signal in response to the request signal addressed to the memory bank.

38. The apparatus in accordance with claim 37 wherein the memory address signal does not switch without the request signal.

39. The apparatus in accordance with claim 33 wherein said means for asserting memory control signals further includes:

means for asserting memory read enable signal having a pulse corresponding to a read request addressed to the memory bank; and means for asserting memory write enable signal having a pulse corresponding to a write request addressed to the memory bank.

40. The apparatus in accordance with claim 31, further comprising:

means for temporally maintaining write data received from the multiple processors in a write buffer in response to a write request; and means for generating a second write request based on a buffer state.

41. The apparatus according to claim 40, further comprising:

means for temporally maintaining read data in a read buffer associated with the requesting processor, the read data being read from a memory bank for the requesting processor.

42. The apparatus according to claim 41, further comprising:

means for reading, in response to a read request from one of the multiple processor, the requested data from the write buffer if the requested data is maintained in the write buffer;

means for reading, in response to the read request, the requested data from the read buffer for the requesting processor if the requested data is maintained in the read buffer; and means for asserting a read request signal for a memory bank if the requested data is not maintained in the buffers.

43. The apparatus in accordance with claim 40, further comprising means for solving conflict between a read request from one of the multiple processors and a write request from the write buffer.

* * * * *